VARIABLE RESISTANCE DIODE IN AN AUTOMATIC SIGNAL VOLTAGE LEVELER

Filed April 22, 1966

INVENTOR.
FRED A. DEXTER

BY [signature]
[signature]
ATTORNEYS

United States Patent Office 3,497,721
Patented Feb. 24, 1970

3,497,721

VARIABLE RESISTANCE DIODE IN AN AUTOMATIC SIGNAL VOLTAGE LEVELER

Fred A. Dexter, 4715 Filipo St., San Diego, Calif. 92115

Filed Apr. 22, 1966, Ser. No. 546,131
Int. Cl. H03k 5/08
U.S. Cl. 307—237 5 Claims

ABSTRACT OF THE DISCLOSURE

A diode with a curved current-voltage characteristic is connected in series with a relatively large fixed resistance across the voltage source. A forward bias for the diode, as a function of signal strength, is adjusted within the nonlinear region of the characteristic curve to obtain a variable resistance in response to the amplitude of the input signal so that the output signal, across the diode, is of a constant voltage.

This invention relates to signal voltage attenuators and is particularly directed to means for compressing signal voltages variable in amplitude over a wide range to a voltage of substantially constant amplitude, all without distortion or loss of information.

In many signaling systems including sonar, radar and radio, the signal to be processed varies widely in amplitude, yet the information to be derived must not deteriorate or be lost. Most automatic volume control systems are complex and generally cannot obtain extreme amplification or attenuation without distortion. Clipping circuits are notorious for distortion because the peaks of signals which may rise above a predetermined limit are clipped off and the information which may be contained in those peaks is lost.

The object of this invention is to provide improved means for attenuating received signals without regard to amplitude, to a substantially constant signal level.

The object of this invention is attained by a novel voltage dividing potentiometer comprising a fixed resistance of substantial ohmic resistance in series with the variable resistance of a solid state diode. The diode is forward biased by a portion of the received signal, and the output signal is taken from across the diode. The forward bias, measured by the net difference between the voltage on the two terminals of the diode, is varied as the signal amplitude changes, to decrease the resistance of the diode as the incoming signal amplitude increases. The signal voltage across the diode is free of all distortion because no nonlinear impedance elements are involved. Imporantly, the drop across the diode is varied over a wide range commensurate with the range of the amplitude of the signal applied across the terminals of the divider.

Other objects and features of this invention will become apparent to those skilled in the art by referring to the preferred embodiment of the invention described in the following specification and shown in the accompanying drawing in which.

Figure 1:
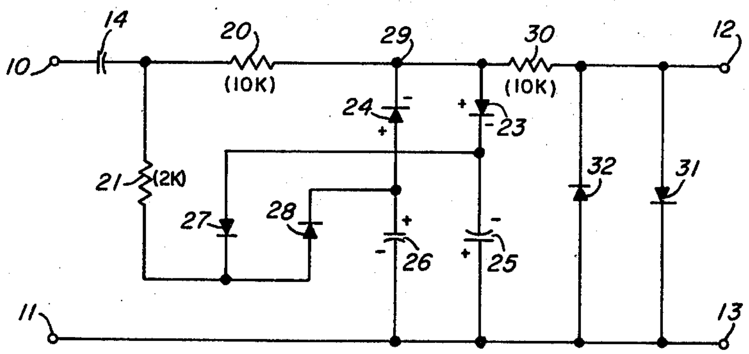
FIG. 1 is a schematic circuit diagram of one attenuator according to this invention.

It is contemplated that the input terminals 10 and 11 of the attenuator of FIG. 1 shall be connected to any signal source capable of producing high or low frequency signals of wide amplitude. For example, the output of a sonar receiver may contain signals of a broad frequency spectrum from a hydrophone amplifier which signals may vary as much as 50 or more db. when the hydrophone is placed near or remote from the acoustical signal source. The signal at 10 and 11 may contain voice or telemetered intelligence. In all cases it is vital that none of the information will be sacrificed in the signal processing. It is desirable that the output signal at output terminals 12 and 13 be of substantially constant level. Constant level is particularly important where the signal is to be converted say to binary information for feeding to a digital computer. Usually a decoupling condenser 14 is employed at the input.

According to this invention a voltage divider is connected across the signal circuit, the voltage divider comprising the fixed resistance 20 in series with the variable resistance of diode 24, and the large storage condenser 26. The impedance of the condenser 26 is negligible at any signal frequency to be received. Fixed resistance 20 is relatively large and the forward resistance of diode 24 is variable from a relatively small to a relatively high value. It will be seen that the output signal voltage is derived essentially from junction 29 of the divider, between the elements 20 and 24, and that the output voltage is found between junction 29 and ground. For convenience, the bus 11–13 will be considered ground. Because condenser 26 is large, the signal voltage drop across the condenser is negligible.

According to an important feature of this invention diode 24 is forwardly biased by the diode 28. Diode 28 is connected in series with the resistance 21, hence, in shunt across the divider 20, 24. A portion of the input signal energy of one polarity at terminal 10 feeds through the resistor 21, is rectified by the diode 28 and charges storage condenser 26. In the example of FIG. 1, the polarity of diode 28 is so chosen as to establish a positive condenser voltage on the upper terminal of the condenser 26 to which is connected to the anode terminal of the divider diode 24. Now, diode 24 is forwardly biased and current caused by negative signal voltages at terminal 10 will flow.

Figure 2:
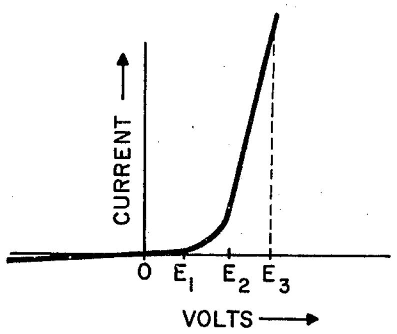
FIG. 2 is a respresentative voltage-current characteristic of the diodes employed in the attenuator circuit of FIG. 1.

Diode 24 may be of any commercially obtainable type, such as the 1N118 or the 1N277, which has the characteristic of the type shown in FIG. 2. With such a diode, a finite forward voltage $E_1$ is required before any diode current will start to flow. At forward voltages below $E_1$, the resistance of the diode can be considered to be infinite. As the forward voltage increases beyond $E_1$, the resistance progressively drops until voltage $E_2$ is reached where the resistance is established at a fixed relatively low value evidenced by the linear portion of the characteristic beyond the knee. It may be generalized that the resistance of diode 24, below forward voltage $E_2$, is a variable resistance because of the curvature of the input-output characteristic, and above $E_2$ is substantially constant because of the linearity of the characteristic. Reverse curvature of the characteristic will appear beyond some high forward voltage $E_3$, beyond which the diode quickly saturates.

The criteria for selecting the value of resistance 21 is the loading that may be permitted across the signal course at 10, 11. To reduce loading, resistance 21 should be high, yet if too high the time constant of the storage condenser may be excessive. The time constant should be short enough to permit the bias voltage to follow sudden changes in amplitude. Secondly, the ohmic value of resistance 21 should be less than the ohmic value of resistance 20 so that the charging rate of condenser 26 through 21 and 28 is greater, under the positive loops of the signal, then is the discharging rate of the condenser through 20 and 24 under the negative loops of the signal. Where the diodes are of the type mentioned and the capacity of condenser 26 is 10 microfarads, the resistance of element 21 was chosen at two thousand ohms which was found to respond well to rapidly changing signal amplitudes without overloading the output of the signal source. The value of resistance 20 was chosen at ten thousand ohms. Now, any input voltage applied across input terminals 10 and 11 will be divided downwardly by the ratio of the resistance of element 20 and the forward resistance of diode 24.

For attenuation of both positive and negative excursions of the input signal, voltage divider diode 23 is connected in series with resistor 20 and storage condenser 25, and divider diodes 23 and 24 are oppositely polarized with respect to the input or output circuits. The forward bias on diode 23 is provided by diode 27 connected also in series with current limiting resistor 21 and the storage condenser 25. The upper terminal of storage condenser 25 connected to the cathode terminal of diode 23 is made negative by the polarization of diode 27, as shown. Preferably, diodes 23 and 24 have similar characteristics such as that shown in FIG. 2.

Figure 3:
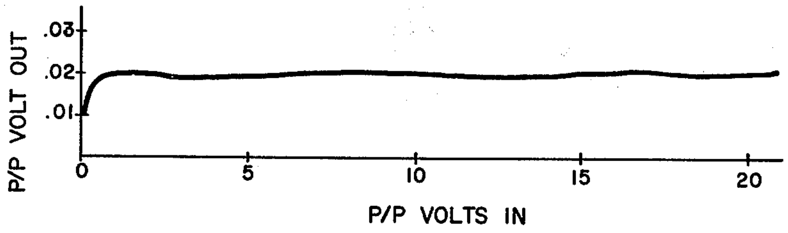
FIG. 3 shows the relationship of the input to the output signal voltage of the attenuator of FIG. 1.

The overall characteristics of the attenuator is shown in FIG. 3. It has been found that with the diodes and resistance values mentioned, a pure sine wave voltage at terminals 10 and 11 will be compressed and will appear at the output terminals 12 and 13 without measurable distortion. The output voltage was steady at about .020 volt throughout an input range from less than one volt to over twenty volts.

If additional range is desired, a second series resistance 30 and shunt diode 31 and 32 may be added. Element 30, 31 and 32 would protect the output 12 and 13 from unusual surges of signal power.

Many modifications may be made in the ohmic values of the resistors of this attenuator and different diodes may be employed without departing from the scope of the invention as defined in the appended claims.

What is claimed is:

1. An attenuator for leveling without distortion all signal voltages of a wide range of voltages to a single substantially constant voltage amplitude, said attenutor comprising;

a voltage divider connected cross the voltage source, said divider consisting of a first resistance connected in series with a first diode, and a condenser, an output circuit connected across said diode and condenser, means for forwardly biasing said first diode comprising a second fixed resistance and a second diode connected in series across said first resistance and first diode, said first and second diodes being oppositely polarized with respect to said condenser, and said second fixed resistance and said first resistance being so proportioned as to forwardly bias said first diode substantially within the nonlinear portion of the input-output voltage characteristic of said first diode, so that the resistance of said diode varies to hold the output signal voltage substantially constant without distortion as the input signal voltage varies throughout said wide range.

2. In the attenuator defined in claim 1, the ohmic value of said second fixed resistance being lower than the ohmic value of said first fixed resistance so that the charging rate of said condenser is greater through said second resistance than through said first resistance and the polarity of the charge is proper to forwardly bias said first diode.

3. An attenuator comprising;

a potentiometer connected across the signal source to be attenuated, said potentiometer including a fixed resistance, a variable resistance, and a storage condenser connected in series, an output signal circuit coupled across said variable resistance, said variable resistance comprising a diode with a nonlinear voltage-current characteristic of the type in which the apparent resistance across the diode progressively decreases from a substantial open-circuit value at near-zero forward voltage to a relatively low resistance at a predetermined forward voltage, and a rectifier coupled between the signal source and said storage condenser for charging said condenser to a voltage proportional to the signal amplitude, the polarity of the charge being selected to forwardly bias the terminal of said diode connected to said condenser, and the amplitude of the charge being such as to keep said forward bias within the range of said nonlinear voltage-current characteristic.

4. The attenuator defined in claim 3 further comprising;

a second diode and a second storage condenser connected in series across the first-mentioned diode and condenser of the said potentiometer for providing forward-conduction resistance to signals of both polarities across the output circuit, and a second rectifier coupled between the signal source and said second storage condenser for charging said second condenser to a voltage proportional to the mean signal amplitude, the polarity of the charge being selected to forwardly bias the connected terminal of said second diode.

5. The attenuator defined in claim 3 further comprising;

a resistance connected in series with said rectifier, the ohmic value of said resistance being large enough to limit the current flow into the connected storage condenser to a predetermined level and yet small enough to limit the time constant of the charging circuit to a value commensurate with expected sudden signal amplitude changes.

References Cited

UNITED STATES PATENTS

| | | | |
|---|---|---|---|
| 2,835,867 | 5/1958 | Golden | 323—66 |
| 2,999,925 | 9/1961 | Thomas | 328—171 XR |

FOREIGN PATENTS

| | | |
|---|---|---|
| 556,891 | 5/1958 | Canada. |

DONALD D. FORRER, Primary Examiner

S. D. MILLER, Assistant Examiner

U.S. Cl. X.R.

307—317; 328—171, 173; 330—138, 140; 333—14, 17